US011997468B2

(12) United States Patent
Gejo et al.

(10) Patent No.: US 11,997,468 B2
(45) Date of Patent: May 28, 2024

(54) PROCESSING DEVICE, PROCESSING METHOD, REPRODUCING METHOD, AND PROGRAM

(71) Applicant: JVCKENWOOD Corporation, Yokohama (JP)

(72) Inventors: Takahiro Gejo, Yokohama (JP); Hisako Murata, Yokohama (JP); Masaya Konishi, Yokohama (JP); Yumi Fujii, Yokohama (JP); Kuniaki Takachi, Yokohama (JP); Toshiaki Nagai, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 310 days.

(21) Appl. No.: 17/400,672

(22) Filed: Aug. 12, 2021

(65) Prior Publication Data

US 2021/0377684 A1 Dec. 2, 2021

Related U.S. Application Data

(63) Continuation of application No. PCT/JP2019/050601, filed on Dec. 24, 2019.

(30) Foreign Application Priority Data

Feb. 14, 2019 (JP) ................................ 2019-024336

(51) Int. Cl.
*H04R 5/02* (2006.01)
*H04R 5/04* (2006.01)
*H04S 1/00* (2006.01)

(52) U.S. Cl.
CPC ............... *H04S 1/005* (2013.01); *H04R 5/02* (2013.01); *H04R 5/04* (2013.01); *H04S 2400/01* (2013.01); *H04S 2420/01* (2013.01)

(58) Field of Classification Search
CPC ....... H04R 5/02; H04S 1/005; H04S 2400/01; H04S 2420/01
(Continued)

(56) References Cited

U.S. PATENT DOCUMENTS 5,862,227 A 1/1999 Orduna-Bustamante et al.
2003/0182134 A1* 9/2003 Oyama ................ G10L 19/083 704/503
(Continued)

FOREIGN PATENT DOCUMENTS

CN 106878866 B 6/2017
JP H10-509565 A 9/1998
(Continued)

OTHER PUBLICATIONS

English Translation of JP-2000259190-A (Year: 2000).*

*Primary Examiner* — Katherine A Faley
(74) *Attorney, Agent, or Firm* — Procopio, Cory, Hargreaves & Savitch LLP

(57) ABSTRACT

An object of the present invention is to provide a processing device, a processing method, a reproducing method, and a program capable of performing appropriate processing.
A processing device according to the present embodiment includes: an envelope computation unit computing an envelope for a frequency response of a sound pickup signal; a scale conversion unit generating scale converted data by performing scale conversion and data interpolation on frequency data of the envelope; a normalization factor computation unit dividing the scale converted data into a plurality of frequency bands, obtaining a characteristic value for each frequency band, and computing a normalization factor, based on the characteristic values; and a normalization unit, using the normalization factor, normalizing the sound pickup signal in the time domain.

6 Claims, 8 Drawing Sheets

(58) Field of Classification Search
USPC ........................................................... 381/17
See application file for complete search history.

(56) References Cited

U.S. PATENT DOCUMENTS

| | | | | |
|---|---|---|---|---|
| 2014/0334540 | A1* | 11/2014 | Suzuki | H04N 19/124 375/240.03 |
| 2017/0373656 | A1 | 12/2017 | Bharitkar et al. | |

FOREIGN PATENT DOCUMENTS

| | | | |
|---|---|---|---|
| JP | 2000259190 | A | 9/2000 |
| JP | 2015-126268 | A | 7/2015 |
| JP | 5792994 | B2 | 10/2015 |

* cited by examiner

PROCESSING DEVICE, PROCESSING METHOD, REPRODUCING METHOD, AND PROGRAM

CROSS REFERENCE TO RELATED APPLICATION

This application is a Bypass Continuation of PCT/JP/2019/050601 filed on Dec. 24, 2019, which priority based on Japanese Patent Application No. 2019-24336 filed on Feb. 14, 2019, the disclosure of which is incorporated herein in its entirety by reference.

BACKGROUND

The present invention relates to a processing device, a processing method, a reproducing method, and a program.

A recording and reproduction system disclosed in Published Japanese Translation of PCT International Publication for Patent Application, No. 10-509565 uses a filter means for processing a signal supplied to a loudspeaker. The filter means includes two filter design steps. In the first step, a transfer function between a position of a virtual sound source and a specific position of a reproduced sound field is described in a form of a filter (A). Note that the specific position of the reproduced sound field is ears or a head region of a listener. Further, in the second step, the transfer function filter (A) is convolved with a matrix of a filter (Hx) for crosstalk canceling that is used to invert an electroacoustic transmission path or path group (C) between input to the loudspeaker and the specific position. The matrix of the filter (Hx) for crosstalk canceling is generated by measuring an impulse response.

Sound localization techniques include an out-of-head localization technique, which localizes sound images outside the head of a listener by using headphones. The out-of-head localization technique localizes sound images outside the head by canceling out characteristics from the headphones to the ears (headphone characteristics) and giving two characteristics (spatial acoustic transfer characteristics) from a speaker (monaural speaker) to the ears.

In out-of-head localization reproduction using stereo speakers, measurement signals (impulse sounds or the like) that are output from 2-channel (hereinafter, referred to as "ch") speakers are recorded by microphones placed on the ears of a listener himself/herself. A processing device generates a filter, based on a sound pickup signal obtained by picking up the measurement signals. The generated filter is convolved with 2-ch audio signals, and the out-of-head localization reproduction is thereby achieved.

Further, in order to generate filters that cancel out characteristics from headphones to the ears, characteristics from the headphones to the ears or eardrums (ear canal transfer function ECTF, also referred to as ear canal transfer characteristics) are measured by the microphones placed on the ears of the listener himself/herself.

In Japanese Unexamined Patent Application Publication No. 2015-126268, a method for generating an inverse filter of an ear canal transfer function is disclosed. In the method in Japanese Unexamined Patent Application Publication No. 2015-126268, an amplitude component of the ear canal transfer function is corrected to prevent high-pitched noise caused by a notch. Specifically, when gain of the amplitude component falls below a gain threshold value, the notch is adjusted by correcting a gain value. An inverse filter is generated based on an ear canal transfer function after correction.

SUMMARY

When performing out-of-head localization, it is preferable to measure characteristics with microphones placed on the ears of the listener himself/herself. When ear canal transfer characteristics are measured, impulse response measurement and the like are performed with microphones and headphones placed on the ears of the listener. A use of characteristics of the listener himself/herself enables a filter suited for the listener to be generated. It is desirable to appropriately process a sound pickup signal obtained in the measurement for filter generation and the like.

The present embodiment has been made in consideration of the above-described problems, and an object of the present invention is to provide a processing device, a processing method, a reproducing method, and a program capable of appropriately processing a sound pickup signal.

A processing device according to the present embodiment includes: an envelope computation unit configured to compute an envelope for a frequency response of a sound pickup signal; a scale conversion unit configured to generate scale converted data by performing scale conversion and data interpolation on frequency data of the envelope; a normalization factor computation unit configured to divide the scale converted data into a plurality of frequency bands, obtain a characteristic value for each frequency band, and compute a normalization factor, based on the characteristic values; and a normalization unit configured to, using the normalization factor, normalize the sound pickup signal in a time domain.

A processing method according to the present embodiment includes: a step of computing an envelope for a frequency response of a sound pickup signal; a step of generating scale converted data by performing scale conversion and data interpolation on frequency data of the envelope; a step of dividing the scale converted data into a plurality of frequency bands, obtaining a characteristic value for each frequency band, and computing a normalization factor, based on the characteristic values; and a step of, using the normalization factor, normalizing the sound pickup signal in a time domain.

A program according to the present embodiment is a program causing a computer to execute a processing method, and the processing method includes: a step of computing an envelope for a frequency response of a sound pickup signal; a step of generating scale converted data performing scale conversion and data interpolation on frequency data of the envelope; a normalization factor computation unit configured to divide the scale; a step of dividing the scale converted data into a plurality of frequency bands, obtaining a characteristic value for each frequency band, and computing a normalization factor, based on the characteristic values; and a step of, using the normalization factor, normalizing the sound pickup signal in a time domain.

DETAILED DESCRIPTION

An overview of sound localization according to the present embodiment will be described. Out-of-head localization according to the present embodiment performs out-of-head localization by using spatial acoustic transfer characteristics and ear canal transfer characteristics. The spatial acoustic transfer characteristics are transfer characteristics from a sound source, such as a speaker, to the ear canal. The ear canal transfer characteristics are transfer characteristics from a speaker unit of headphones or earphones to the eardrum. In the present embodiment, spatial acoustic transfer characteristics while headphones or earphones are not worn are measured, ear canal transfer characteristics while headphones or earphones are worn are measured, and the out-of-head localization is achieved by using measurement data in the measurements. The present embodiment has a distinctive feature in a microphone system for measuring spatial acoustic transfer characteristics or ear canal transfer characteristics.

The out-of-head localization according to this embodiment is performed by a user terminal, such as a personal computer, a smartphone, and a tablet PC. The user terminal is an information processing device including a processing means, such as a processor, a storage means, such as a memory and a hard disk, a display means, such as a liquid crystal monitor, and an input means, such as a touch panel, a button, a keyboard, and a mouse. The user terminal may have a communication function to transmit and receive data. Further, an output means (output unit) with headphones or earphones is connected to the user terminal. The user terminal and the output means may be connected to each other by means of wired connection or wireless connection.

First Embodiment (Out-of-Head Localization Device)

Figure 1:
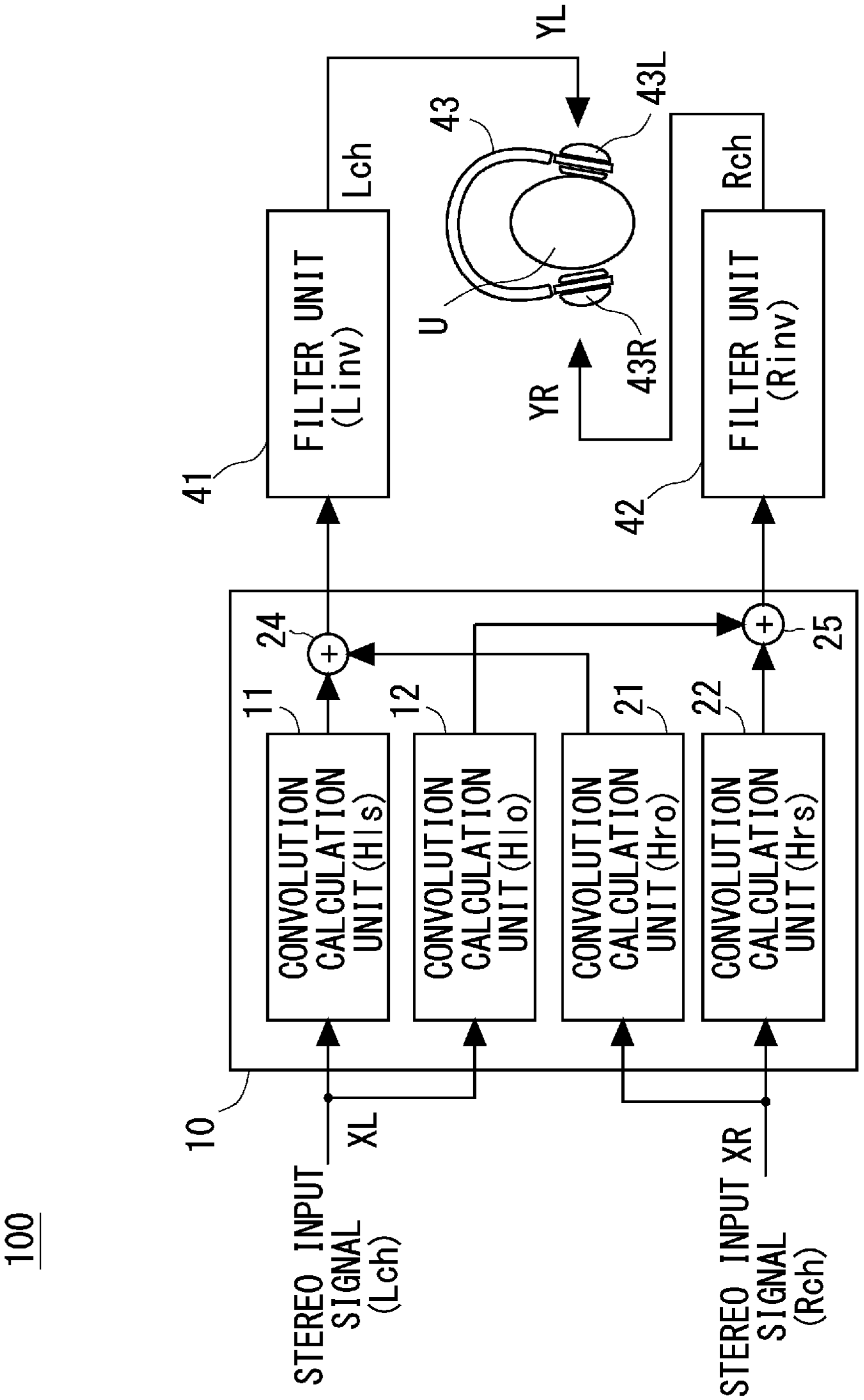
FIG. 1 is a block diagram illustrating an out-of-head localization device according to the present embodiment.

A block diagram of an out-of-head localization device 100, which is an example of a sound field reproduction device according to the present embodiment, is illustrated in FIG. 1. The out-of-head localization device 100 reproduces a sound field for a user U who is wearing headphones 43. Thus, the out-of-head localization device 100 performs sound localization for L-ch and R-ch stereo input signals XL and XR. The L-ch and R-ch stereo input signals XL and XR are analog audio reproduced signals that are output from a CD (Compact Disc) player or the like or digital audio data, such as mp3 (MPEG Audio Layer-3). Note that the audio reproduction signals or the digital audio data are collectively referred to as reproduction signals. In other words, the L-ch and R-ch stereo input signals XL and XR serve as the reproduction signals.

Note that the out-of-head localization device 100 is not limited to a physically single device, and a part of processing may be performed in a different device. For example, a part of processing may be performed by a smartphone or the like, and the rest of the processing may be performed by a DSP (Digital Signal Processor) or the like built in the headphones 43.

The out-of-head localization device 100 includes an out-of-head localization unit 10, a filter unit 41 storing an inverse filter Linv, a filter unit 42 storing an inverse filter Rinv, and the headphones 43. The out-of-head localization unit 10, the filter unit 41, and the filter unit 42 can specifically be implemented by a processor or the like.

The out-of-head localization unit 10 includes convolution calculation units 11, 12, 21, and 22 that store spatial acoustic transfer characteristics Hls, Hlo, Hro, and Hrs, respectively, and adders 24 and 25. The convolution calculation units 11, 12, 21, and 22 perform convolution processing using the spatial acoustic transfer characteristics. The stereo input signals XL and XR from a CD player or the like are input to the out-of-head localization unit 10. The out-of-head localization unit 10 has the spatial acoustic transfer characteristics set therein. The out-of-head localization unit 10 convolves filters having the spatial acoustic transfer characteristics (hereinafter, also referred to as spatial acoustic filters) with each of the stereo input signals XL and XR on the respective channels. The spatial acoustic transfer characteristics may be a head-related transfer function HRTF measured on the head or auricle of a person being measured, or may be the head-related transfer function of a dummy head or a third person.

A set of the four spatial acoustic transfer characteristics Hls, Hlo, Hro, and Hrs is defined as a spatial acoustic transfer function. Data used for the convolution in the convolution calculation units 11, 12, 21, and 22 serve as the spatial acoustic filters. A spatial acoustic filter is generated by cutting out each of the spatial acoustic transfer characteristics Hls, Hlo, Hro, and Hrs with a specified filter length.

Each of the spatial acoustic transfer characteristics Hls, Hlo, Hro, and Hrs has been acquired in advance by means of impulse response measurement or the like. For example, the user U wears a microphone on each of the left and right ears. Left and right speakers placed in front of the user U output impulse sounds for performing impulse response measurement. Then, the microphones pick up measurement signals, such as the impulse sounds, output from the speakers. The spatial acoustic transfer characteristics Hls, Hlo, Hro, and Hrs are acquired based on sound pickup signals picked up by the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 convolves a spatial acoustic filter appropriate to the spatial acoustic transfer characteristics Hls with the L-ch stereo input signal XL. The convolution calculation unit 11 outputs the convolution calculation data to the adder 24. The convolution calculation unit 21 convolves a spatial acoustic filter appropriate to the spatial acoustic transfer characteristics Hro with the R-ch stereo input signal XR. The convolution calculation unit 21 outputs the convolution calculation data to the adder 24. The adder 24 adds the two sets of convolution calculation data and outputs the added data to the filter unit 41.

The convolution calculation unit 12 convolves a spatial acoustic filter appropriate to the spatial acoustic transfer characteristics Hlo with the L-ch stereo input signal XL. The convolution calculation unit 12 outputs the convolution calculation data to the adder 25. The convolution calculation unit 22 convolves a spatial acoustic filter appropriate to the spatial acoustic transfer characteristics Hrs with the R-ch stereo input signal XR. The convolution calculation unit 22 outputs the convolution calculation data to the adder 25. The adder 25 adds the two sets of convolution calculation data and outputs the added data to the filter unit 42.

The inverse filters Linv and Rinv that cancel out headphone characteristics (characteristics between reproduction units of the headphones and microphones) are set to the filter units 41 and 42, respectively. The inverse filters Linv and Rinv are convolved with the reproduction signals (convolution calculation signals) that have been subjected to the processing in the out-of-head localization unit 10. The filter unit 41 convolves the inverse filter Linv of the L-ch side headphone characteristics with the L-ch signal from the adder 24. Likewise, the filter unit 42 convolves the inverse filter Rinv of the R-ch side headphone characteristics with the R-ch signal from the adder 25. The inverse filters Linv and Rinv cancel out characteristics from a headphone unit to the microphones when the headphones 43 are worn. Each of the microphones may be placed at any position between the entrance of the ear canal and the eardrum.

The filter unit 41 outputs a processed L-ch signal YL to a left unit 43L of the headphones 43. The filter unit 42 outputs a processed R-ch signal YR to a right unit 43R of the headphones 43. The user U is wearing the headphones 43. The headphones 43 output the L-ch signal YL and the R-ch signal YR (hereinafter, the L-ch signal YL and the R-ch signal YR are also collectively referred to as stereo signals) toward the user U. This configuration enables a sound image localized outside the head of the user U to be reproduced.

As described above, the out-of-head localization device 100 performs out-of-head localization by using the spatial acoustic filters appropriate to the spatial acoustic transfer characteristics Hls, Hlo, Hro, and Hrs and the inverse filters Linv and Rinv of the headphone characteristics. In the following description, the spatial acoustic filters appropriate to the spatial acoustic transfer characteristics Hls, Hlo, Hro, and Hrs and the inverse filters Linv and Rinv of the headphone characteristics are collectively referred to as out-of-head localization filters. In the case of 2ch stereo reproduction signals, the out-of-head localization filters are made up of four spatial acoustic filters and two inverse filters. The out-of-head localization device 100 carries out convolution calculation on the stereo reproduction signals by using the total six out-of-head localization filters and thereby performs out-of-head localization. The out-of-head localization filters are preferably based on measurement with respect to the user U himself/herself. For example, the out-of-head localization filters are set based on sound pickup signals picked up by the microphones worn on the ears of the user U.

As described above, the spatial acoustic filters and the inverse filters Linv and Rinv of the headphone characteristics are filters for audio signals. The filters are convolved with the reproduction signals (stereo input signals XL and XR), and the out-of-head localization device 100 thereby performs out-of-head localization. In the present embodiment, processing to generate the inverse filters Linv and Rinv is one of the technical features of the present invention. The processing to generate the inverse filters will be described hereinbelow.

(Measurement Device of Ear Canal Transfer Characteristics)

Figure 2:
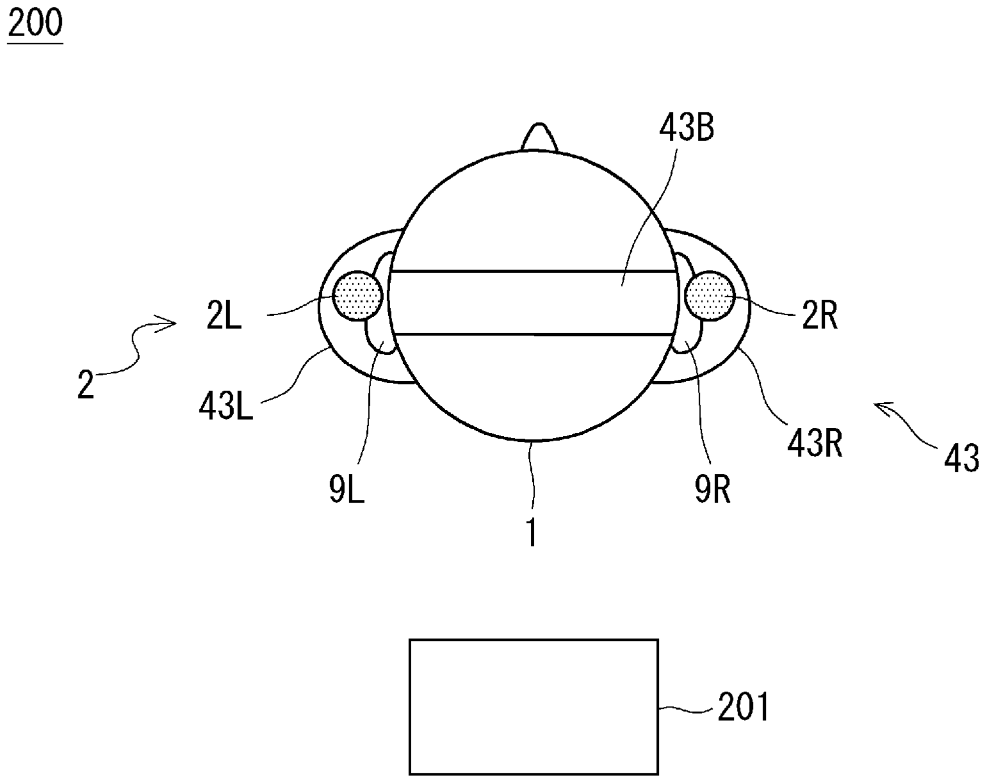
FIG. 2 is a diagram schematically illustrating a configuration of a measurement device.

A measurement device 200 that measures ear canal transfer characteristics to generate the inverse filters will be described using FIG. 2. FIG. 2 illustrates a configuration for measuring transfer characteristics with respect to the user U. The measurement device 200 includes a microphone unit 2, the headphones 43, and a processing device 201. Note that, in this configuration, a person 1 being measured is the same person as the user U in FIG. 1.

In the present embodiment, the processing device 201 of the measurement device 200 performs calculation processing for appropriately generating filters according to measurement results. The processing device 201 is a personal computer (PC), a tablet terminal, a smartphone, or the like and includes a memory and a processor. The memory stores a processing program, various types of parameters, measurement data, and the like. The processor executes the processing program stored in the memory. The processor executing the processing program causes respective processes to be performed. The processor may be, for example, a CPU (Central Processing Unit), an FPGA (Field-Programmable Gate Array), a DSP (Digital Signal Processor), an ASIC (Application Specific Integrated Circuit), or a GPU (Graphics Processing Unit).

To the processing device 201, the microphone unit 2 and the headphones 43 are connected. Note that the microphone unit 2 may be built in the headphones 43. The microphone unit 2 include a left microphone 2L and a right microphone 2R. The left microphone 2L is placed on a left ear 9L of the user U. The right microphone 2R is placed on a right ear 9R of the user U. The processing device 201 may be the same processing device as the out-of-head localization device 100 or a different processing device from the out-of-head localization device 100. In addition, earphones can be used in place of the headphones 43.

The headphones 43 include a headphone band 43B, the left unit 43L, and the right unit 43R. The headphone band 43B connects the left unit 43L and the right unit 43R to each other. The left unit 43L outputs sound toward the left ear 9L of the user U. The right unit 43R outputs sound toward the right ear 9R of the user U. The headphones 43 are, for example, closed headphones, open headphones, semi-open headphones, or semi-closed headphones, and any type of headphones can be used. The user U wears the headphones 43 with the microphone unit 2 worn by the user U. In other words, the left unit 43L and the right unit 43R of the headphones 43 are placed on the left ear 9L and the right ear 9R on which the left microphone 2L and the right microphone 2R are placed, respectively. The headphone band 43B exerts a biasing force that presses the left unit 43L and the right unit 43R to the left ear 9L and the right ear 9R, respectively.

The left microphone 2L picks up sound output from the left unit 43L of the headphones 43. The right microphone 2R picks up sound output from the right unit 43R of the headphones 43. Microphone portions of the left microphone 2L and the right microphone 2R are respectively arranged at sound pickup positions in vicinities of the outer ear holes. The left microphone 2L and the right microphone 2R are configured to avoid interference with the headphones 43. In other words, the user U can wear the headphones 43 with the left microphone 2L and the right microphone 2R placed at appropriate positions on the left ear 9L and the right ear 9R, respectively.

The processing device 201 outputs a measurement signal to the headphones 43. The measurement signal causes the headphones 43 to generate impulse sounds or the like. Specifically, an impulse sound output from the left unit 43L is measured by the left microphone 2L. An impulse sound output from the right unit 43R is measured by the right microphone 2R. The microphones 2L and 2R acquiring sound pickup signals at the time of the output of the measurement signal causes impulse response measurement to be performed.

Figure 3:
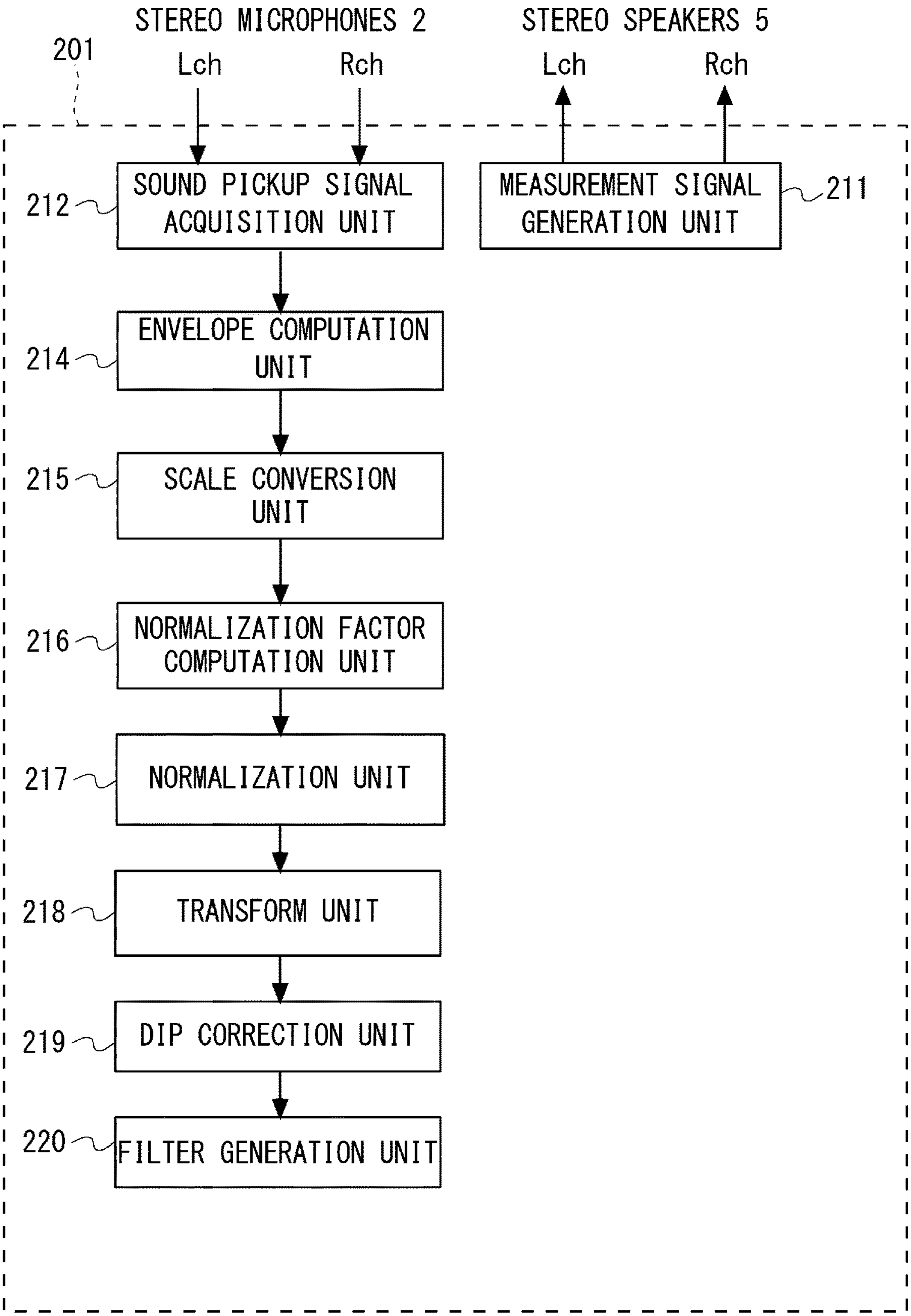
FIG. 3 is a block diagram illustrating a configuration of a processing device.

The processing device 201 generates the inverse filters Linv and Rinv by performing the same processing on the sound pickup signals from the microphones 2L and 2R. The processing device 201 of the measurement device 200 and processing thereof will be described in detail hereinbelow. FIG. 3 is a control block diagram illustrating the processing device 201. The processing device 201 includes a measurement signal generation unit 211, a sound pickup signal acquisition unit 212, an envelope computation unit 214, and a scale conversion unit 215. The processing device 201 further includes a normalization factor computation unit 216, a normalization unit 217, a transform unit 218, a dip correction unit 219, and a filter generation unit 220.

The measurement signal generation unit 211 includes a D/A converter, an amplifier, and the like and generates a measurement signal for measuring ear canal transfer characteristics. The measurement signal is, for example, an impulse signal, a TSP (Time Stretched Pulse) signal, or the like. In the present embodiment, the measurement device 200 performs impulse response measurement by using impulse sounds as the measurement signal.

Each of the left microphone 2L and the right microphone 2R of the microphone unit 2 picks up the measurement signal, and outputs a sound pickup signal to the processing device 201. The sound pickup signal acquisition unit 212 acquires the sound pickup signals picked up by the left microphone 2L and the right microphone 2R. Note that the sound pickup signal acquisition unit 212 may include an A/D converter that A/D converts the sound pickup signals from the microphones 2L and 2R. The sound pickup signal acquisition unit 212 may perform synchronous addition of signals acquired by a plurality of times of measurement. A sound pickup signal in the time domain is referred to as an ECTF.

The envelope computation unit 214 computes an envelope for a frequency response of a sound pickup signal. The envelope computation unit 214 is capable of computing an envelope, using cepstrum analysis. First, the envelope computation unit 214 computes a frequency response of a sound pickup signal (ECTF), using discrete Fourier transform or discrete cosine transform. The envelope computation unit 214 computes the frequency response by, for example, performing FFT (fast Fourier transform) on an ECTF in the time domain. A frequency response includes a power spectrum and a phase spectrum. Note that the envelope computation unit 214 may generate an amplitude spectrum in place of the power spectrum.

Figure 4:
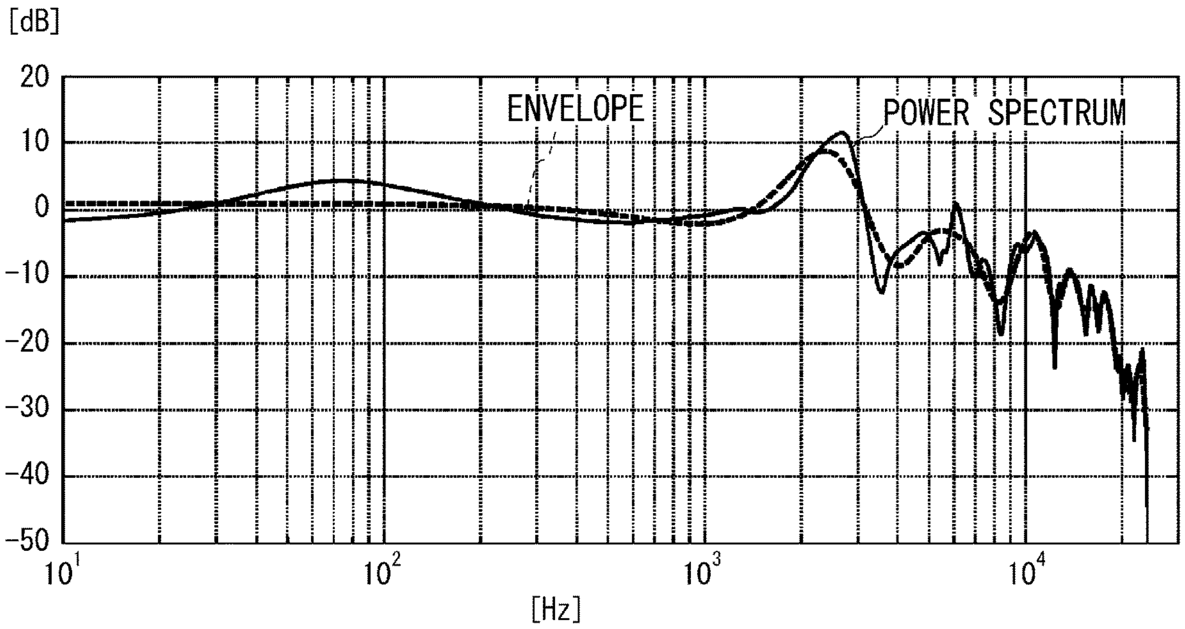
FIG. 4 is a graph illustrating a power spectrum of a sound pickup signal and an envelope thereof.

Respective power values (amplitude values) of the power spectrum are log-transformed. The envelope computation unit 214 computes a cepstrum by inverse Fourier transforming the log-transformed spectrum. The envelope computation unit 214 applies a lifter to the cepstrum. The lifter is a low-pass lifter that passes only low-frequency band components. The envelope computation unit 214 is capable of computing an envelope of the power spectrum of an ECTF by performing FFT on a cepstrum that has passed the lifter. FIG. 4 is a graph illustrating an example of a power spectrum and an envelope thereof.

A use of the cepstrum analysis to compute data of an envelope as described above enables a power spectrum to be smoothed through simple computation. Thus, it is possible to reduce the amount of calculation. The envelope computation unit 214 may use a method other than the cepstrum analysis. For example, the envelope computation unit 214 may compute an envelope by applying a general smoothing method to log-transformed amplitude values. As the smoothing method, a simple moving average, a Savitzky-Golay filter, a smoothing spline, or the like may be used.

The scale conversion unit 215 converts a scale of envelope data in such a way that, on the logarithmic axis, non-equally spaced spectral data are equally spaced. The envelope data that are computed by the envelope computation unit 214 are equally spaced in terms of frequency. In other words, since the envelope data are equally spaced on the linear frequency axis, the envelope data are not equally spaced on the logarithmic frequency axis. Thus, the scale conversion unit 215 performs interpolation processing on envelope data in such a way that, on the logarithmic frequency axis, the envelope data are equally spaced.

In envelope data, on the logarithmic axis, the lower the frequency becomes, the more sparcely adjacent data points are spaced, and the higher the frequency becomes, the more densely adjacent data points are spaced. Hence, the scale conversion unit 215 interpolates data in a low frequency band in which data points are sparcely spaced. Specifically, the scale conversion unit 215 computes discrete envelope data the data points of which are arranged at equal intervals on the logarithmic axis by performing interpolation processing, such as three-dimensional spline interpolation. Envelope data on which the scale conversion has been performed are referred to as scale converted data. The scale converted data is a spectrum in which frequency and power values are associated with each other.

The reason for the conversion to a logarithmic scale will be described. In general, it is said that the amount of sensitivity of a human is converted to logarithmic values. Hence, it becomes important to treat the frequency of audible sound as frequency on the logarithmic axis. Since performing the scale conversion causes data relating to the above-described amount of sensitivity to be equally spaced, it becomes possible to treat the data in the entire frequency band equivalently. As a result, mathematical calculation, division of a frequency band, and weighting of frequency bands become easy, and it thus becomes possible to obtain a stable result. Note that the scale conversion unit 215 is only required to convert envelope data to, without being limited to the logarithmic scale, a scale approximate to the auditory sense of a human (referred to as an auditory scale). The scale conversion may be performed using, as an auditory scale, a log scale, a mel scale, a Bark scale, an ERB (Equivalent Rectangular Bandwidth) scale, or the like. The scale conversion unit 215 converts the scale of envelope data to an auditory scale by means of data interpolation. For example, the scale conversion unit 215 interpolates data in a low frequency band in which data points are sparcely spaced in the auditory scale and thereby densifies the data in the low frequency band. Equally spaced data in the auditory scale are data that are, in a linear scale, densely spaced in a low frequency band and sparcely spaced in a high frequency band. By doing so, the scale conversion unit 215 can generate scale converted data that are equally spaced in the auditory scale. It is needless to say that the scale converted data do not have to be data that are completely equally spaced in the auditory scale.

The normalization factor computation unit 216 computes a normalization factor, based on scale converted data. For that purpose, the normalization factor computation unit 216 divides the scale converted data into a plurality of frequency bands and computes characteristic values for each frequency band. The normalization factor computation unit 216 computes a normalization factor, based on characteristic values for each frequency band. The normalization factor computation unit 216 computes a normalization factor by performing weighted addition of characteristic values for each frequency band.

The normalization factor computation unit 216 divides the scale converted data into four frequency bands (hereinafter, referred to as first to fourth bands). The first band includes frequencies equal to or greater than a minimum frequency (for example, 10 Hz) and less than 1000 Hz. The first band is a range in which a frequency response changes depending on whether or not the headphones 43 fit the person being measured. The second band includes frequencies equal to or greater than 1000 Hz and less than 4 kHz. The second band is a range in which characteristics of the headphones themselves clearly emerge without depending on an individual. The third band includes frequencies equal to or greater than 4 kHz and less than 12 kHz. The third band is a range in which characteristics of an individual emerge most clearly. The fourth band includes frequencies equal to or greater than 12 kHz and less than a maximum frequency (for example, 22.4 kHz). The fourth band is a range in which a frequency response changes every time the headphones are worn. Note that ranges of the respective bands are only exemplifications and are not limited to the above-described values.

The characteristic values are, for example, four values, namely a maximum value, a minimum value, an average value, and a median value, of scale converted data in each band. The four values of the first band are denoted by Amax (maximum value), Amin (minimum value), Aave (average value), and Amed (median value). The four values of the second band are denoted by Bmax, Bmin, Bave, and Bmed. Likewise, the four value of the third band are denoted by Cmax, Cmin, Cave, and Cmed, and the four values of the fourth band are denoted by Dmax, Dmin, Dave, and Dmed.

The normalization factor computation unit 216 computes a standard value, based on four characteristic values, for each band.

When the standard value of the first band is denoted by Astd, the standard value Astd is expressed by the formula (1) below.

$$A\mathrm{std}=A\mathrm{max}\times 0.15+A\mathrm{min}\times 0.15+A\mathrm{ave}\times 0.3+A\mathrm{med}\times 0.4 \quad (1)$$

When the standard value of the second band is denoted by Bstd, the standard value Bstd is expressed by the formula (2) below.

$$B\mathrm{std}=B\mathrm{max}\times 0.25+B\mathrm{min}\times 0.25+B\mathrm{ave}\times 0.4+B\mathrm{med}\times 0.1 \quad (2)$$

When the standard value of the third band is denoted by Cstd, the standard value Cstd is expressed by the formula (3) below.

$$C\mathrm{std}=C\mathrm{max}\times 0.4+C\mathrm{min}\times 0.1+C\mathrm{ave}\times 0.3+C\mathrm{med}\times 0.2 \quad (3)$$

When the standard value of the fourth band is denoted by Dstd, the standard value Dstd is expressed by the formula (4) below.

$$D\mathrm{std}=D\mathrm{max}\times 0.1+D\mathrm{min}\times 0.1+D\mathrm{ave}\times 0.5+D\mathrm{med}\times 0.3 \quad (4)$$

When the normalization factor is denoted by Std, the normalization factor Std is expressed by the formula (5) below.

$$\mathrm{Std}=A\mathrm{std}\times 0.25+B\mathrm{std}\times 0.4+C\mathrm{std}\times 0.25+D\mathrm{std}\times 0.1 \quad (5)$$

As described above, the normalization factor computation unit 216 computes the normalization factor Std by performing weighted addition of characteristic values for each band. The normalization factor computation unit 216 divides the scale converted data into four frequency bands and extracts four characteristic values from each band. The normalization factor computation unit 216 performs weighted addition of sixteen characteristic values. It may be configured such that variance values of the respective bands are computed and the weights are changed according to the variance values. As the characteristic values, integral values or the like may be used. The number of characteristic values per band may be, without being limited to four, five or more or three or less. At least one or more of a maximum value, a minimum value, an average value, a median value, an integral value, and a variance value are only required to serve as characteristic values. In other words, coefficients in the weighted addition for one or more of a maximum value, a minimum value, an average value, a median value, an integral value, and a variance value may be 0.

The normalization unit 217 normalizes a sound pickup signal by use of the normalization factor. Specifically, the normalization unit 217 computes Std×ECTF as a sound pickup signal after normalization. The sound pickup signal after normalization is defined as a normalized ECTF. The normalization unit 217 is capable of normalizing an ECTF to an appropriate level by using the normalization factor.

Figure 5:
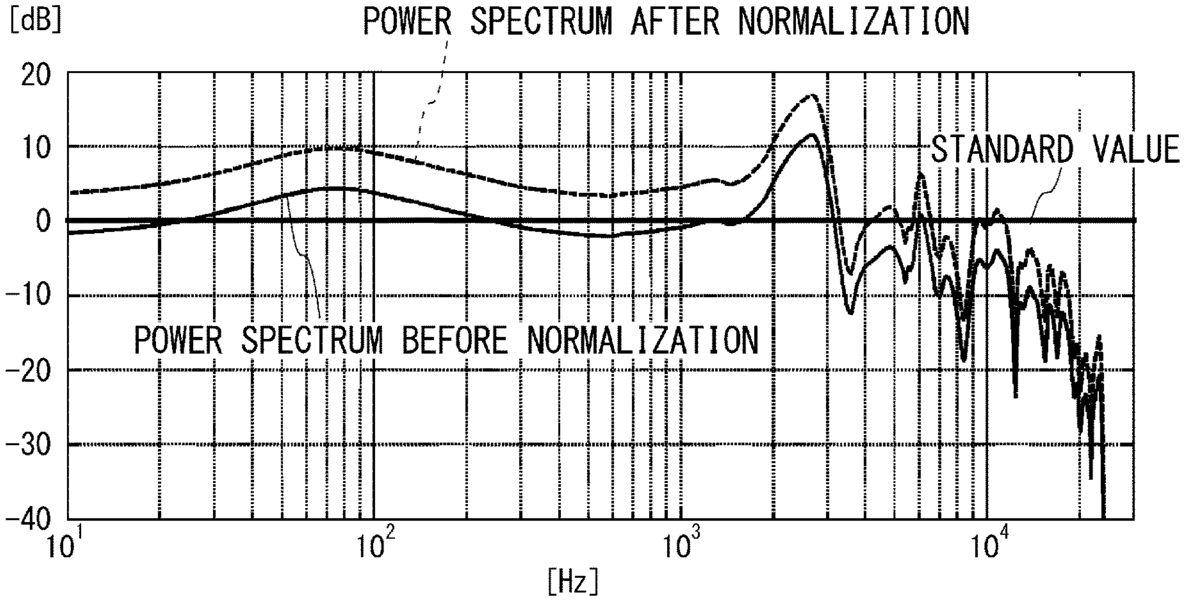
FIG. 5 is a graph illustrating a power spectrum before normalization and a power spectrum after normalization.

The transform unit 218 computes a frequency response of a normalized ECTF, using discrete Fourier transform or discrete cosine transform. For example, the transform unit 218 computes the frequency response by performing FFT (fast Fourier transform) on a normalized ECTF in the time domain. The frequency response of the normalized ECTF includes a power spectrum and a phase spectrum. Note that the transform unit 218 may generate an amplitude spectrum in place of the power spectrum. The frequency response of a normalized ECTF is referred to as a normalized frequency response. The power spectrum and phase spectrum of a normalized ECTF are referred to as a normalized power spectrum and a normalized phase spectrum, respectively. In FIG. 5, a power spectrum before normalization and a power spectrum after normalization are illustrated. Performing normalization causes power values of a power spectrum to change to an appropriate level.

The dip correction unit 219 corrects a dip in a normalized power spectrum. The dip correction unit 219 determines a point at which a power value of the normalized power spectrum is equal to or less than a threshold value to be a dip and corrects the power value at the point determined to be a dip. For example, the dip correction unit 219 corrects a dip by interpolating a power value at a point at which the power value falls below the threshold value. A normalized power spectrum after dip correction is referred to as a corrected power spectrum.

The dip correction unit 219 divides a normalized power spectrum into two bands and sets a different threshold value for each of the bands. For example, with 12 kHz as a boundary frequency, frequencies 12 kHz or lower and frequencies 12 kHz or higher are set as a low frequency band and a high frequency band, respectively. A threshold value for the low frequency band and a threshold value for the high frequency band are referred to as a first threshold value TH1 and a second threshold value TH2, respectively. The first threshold value TH1 is preferably set lower than the second threshold value TH2, for example, the first threshold value TH1 and the second threshold value TH2 may be set at −13 dB and −9 dB, respectively. It is needless to say that the dip correction unit 219 may divide a normalized power spectrum into three bands and set a different threshold value for each of the bands.

Figure 6:
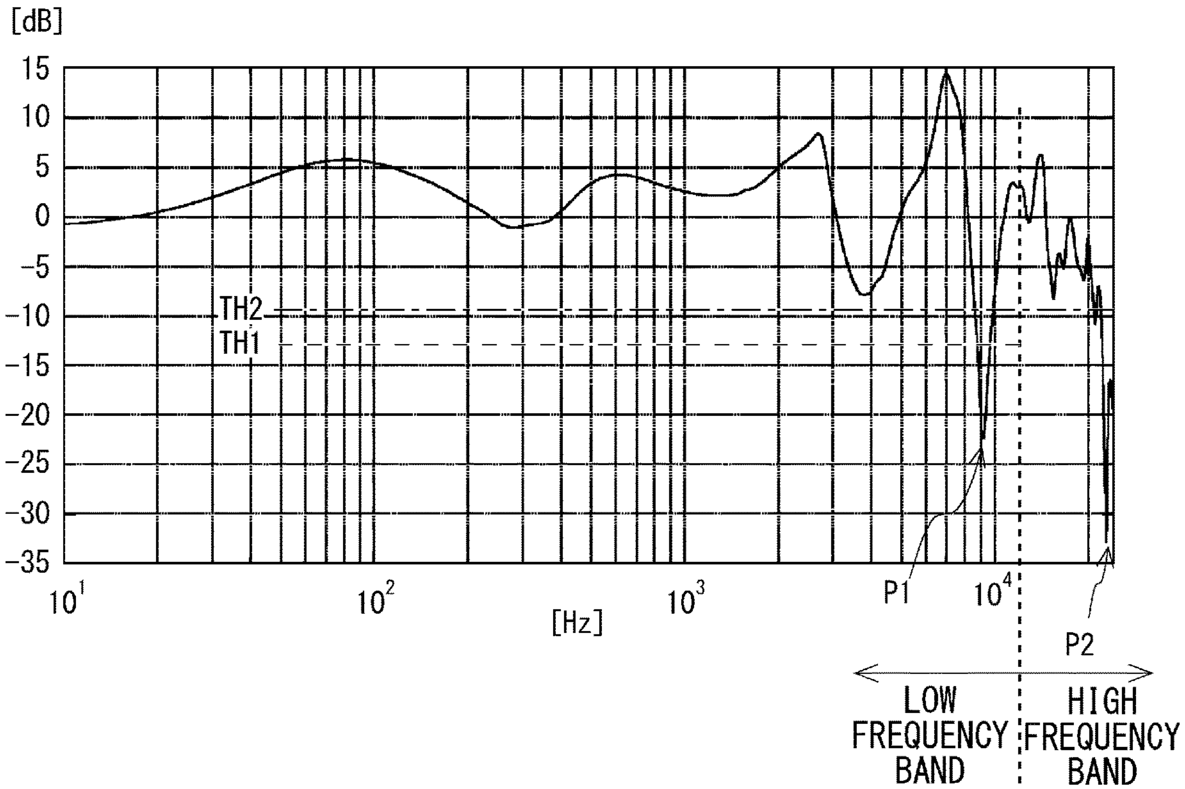
FIG. 6 is a graph illustrating a normalized power spectrum before dip correction.
Figure 7:
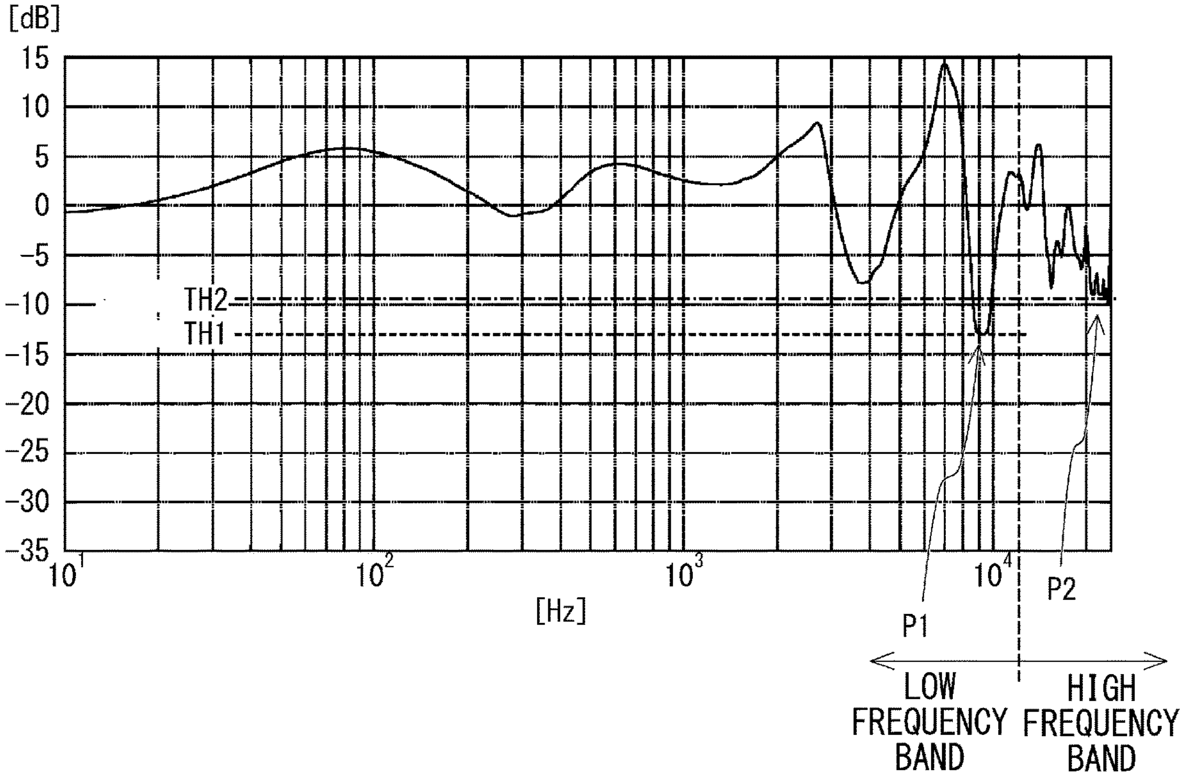
FIG. 7 is a graph illustrating a normalized power spectrum after dip correction.

In FIGS. 6 and 7, a power spectrum before dip correction and a power spectrum after dip correction are illustrated, respectively. FIG. 6 is a graph illustrating a power spectrum before dip correction, that is, a normalized power spectrum. FIG. 7 is a graph illustrating a corrected power spectrum after dip correction.

As illustrated in FIG. 6, in the low frequency band, a power value falls below the first threshold value TH1 at a point P1. The dip correction unit 219 determines, in the low frequency band, the point P1 at which a power value falls below the first threshold value TH1 to be a dip. In the high frequency band, a power value falls below the second threshold value TH2 at a point P2. The dip correction unit 219 determines, in the high frequency band, the point P2 at which a power value falls below the second threshold value TH2 to be a dip.

The dip correction unit 219 increases power values at the points P1 and P2. For example, the dip correction unit 219 replaces the power value at the point P1 with the first threshold value TH1. The dip correction unit 219 replaces the power value at the point P2 with the second threshold value TH2. In addition, the dip correction unit 219 may round boundary portions between points at which power values fall below a threshold value and points at which power values do not fall below the threshold value, as illustrated in FIG. 7. Alternatively, the dip correction unit 219 may correct the dips by interpolating power values at the points P1 and P2 using a method such as spline interpolation.

The filter generation unit 220 generates a filter, using a corrected power spectrum. The filter generation unit 220 obtains inverse characteristics of the corrected power spectrum. Specifically, the filter generation unit 220 obtains inverse characteristics that cancel out the corrected power spectrum (a frequency response in which a dip is corrected). The inverse characteristics are a power spectrum having filter coefficients that cancel out a logarithmic power spectrum after correction.

The filter generation unit 220 computes a signal in the time domain from the inverse characteristics and the phase characteristics (normalized phase spectrum), using inverse discrete Fourier transform or inverse discrete cosine transform. The filter generation unit 220 generates a temporal signal by performing IFFT (inverse fast Fourier transform) on the inverse characteristics and the phase characteristics. The filter generation unit 220 computes an inverse filter by cutting out the generated temporal signal with a specified filter length.

The processing device 201 generates the inverse filter Linv by performing the above-described processing on sound pickup signals picked up by the left microphone 2L. The processing device 201 generates the inverse filter Rinv by performing the above-described processing on sound pickup signals picked up by the right microphone 2R. The inverse filters Linv and Rinv are set to the filter units 41 and 42 in FIG. 1, respectively.

As described above, in the present embodiment, the processing device 201 makes the normalization factor computation unit 216 compute a normalization factor, based on scale converted data. This processing enables the normalization unit 217 to perform normalization, using an appropriate normalization factor. It is possible to compute a normalization factor, focusing on an important band in terms of the auditory sense. In general, when a signal in the time domain is normalized, a normalization factor is determined in such a way that a square sum or an RMS (root-mean-square) has a preset value. The processing of the present embodiment enables a more appropriate normalization factor to be determined than in the case where such a general method is used.

Measurement of ear canal transfer characteristics of the person 1 being measured is performed using the microphone unit 2 and the headphones 43. Further, the processing device 201 can be configured using a smartphone or the like. Therefore, there is a possibility that settings of the measurement differ for each measurement. There is also a possibility that variation occurs in wearing status of the headphones 43 and the microphone unit 2. The processing device 201 performs normalization by multiplying an ECTF by the normalization factor Std computed as described above. Performing processing as described above enables ear canal transfer characteristics to be measured with variance due to settings and the like at the time of measurement suppressed.

Using a corrected power spectrum with a dip corrected by the dip correction unit 219, the filter generation unit 220 computes inverse characteristics. This processing enables power values of the inverse characteristics to be prevented from forming a steeply rising waveform in a frequency band corresponding to a dip. This capability enables an appropriate inverse filter to be generated. Further, the dip correction unit 219 divides a frequency response into two or more frequency bands and set a different threshold value for each of the bands. Performing processing as described above enables a dip to be appropriately corrected with respect to each frequency band. Thus, it is possible to generate more appropriate inverse filters Linv and Rinv.

Further, in order to perform such dip correction appropriately, the normalization unit 217 normalizes an ECTF. The dip correction unit 219 corrects a dip in the power spectrum (or the amplitude spectrum) of a normalized ECTF. Thus, the dip correction unit 219 is capable of correcting a dip appropriately.

Figure 8:
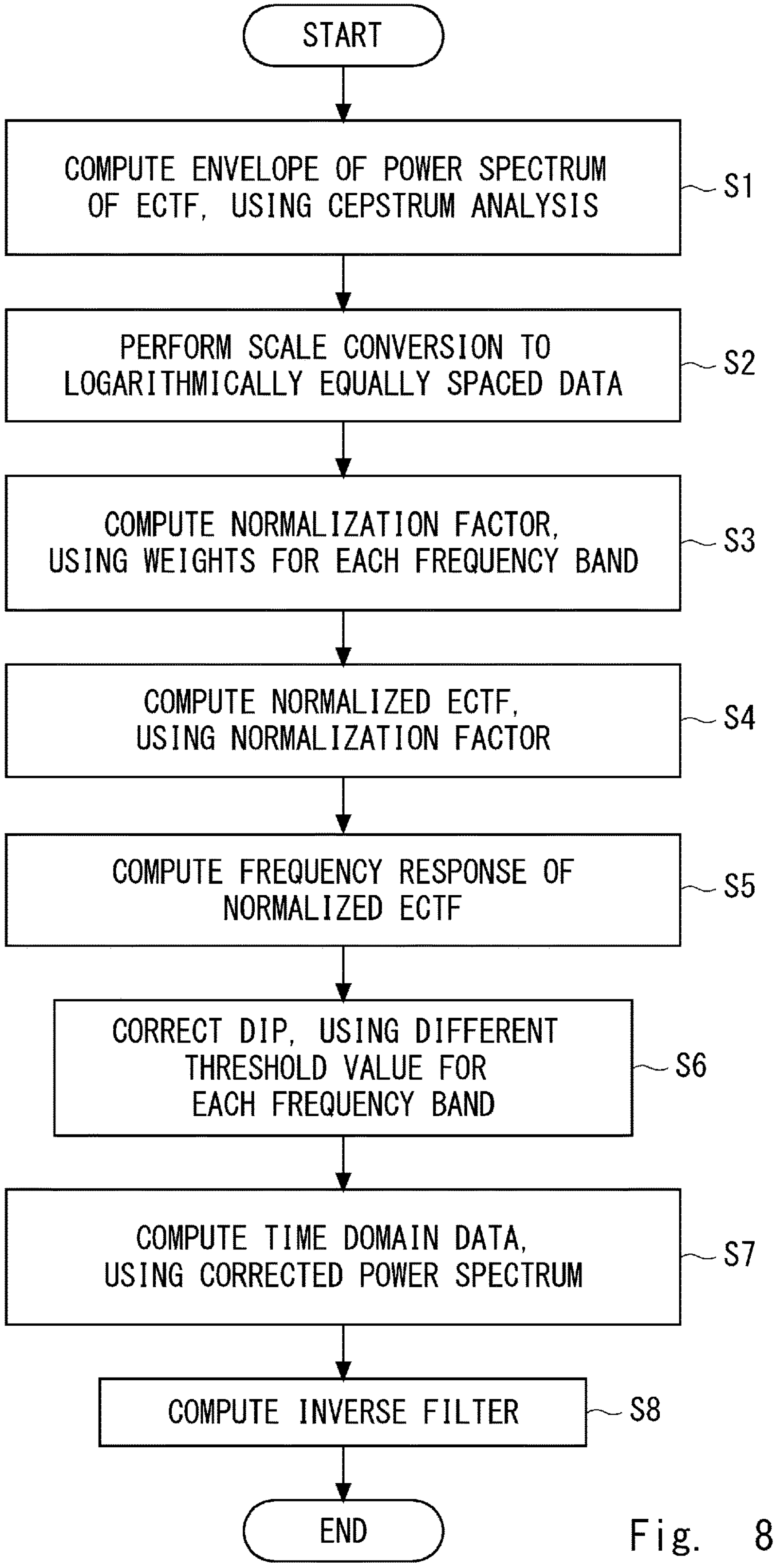
FIG. 8 is a flowchart illustrating filter generation processing.

A processing method in the processing device 201 in the present embodiment will be described using FIG. 8. FIG. 8 is a flowchart illustrating the processing method according to the present embodiment.

First, the envelope computation unit 214 computes an envelope of a power spectrum of an ECTF, using cepstrum analysis (S1). As described above, the envelope computation unit 214 may use a method other than the cepstrum analysis.

The scale conversion unit 215 performs scale conversion from the envelope data to data that are logarithmically equally spaced (S2). The scale conversion unit 215 interpolates data in a low frequency band in which data points are sparcely spaced, using three-dimensional spline interpolation or the like. This processing causes scale converted data in which data points are equally spaced on the logarithmic frequency axis to be obtained. The scale conversion unit 215 may perform scale conversion, using, without being limited to the logarithmic scale, various types of scales described afore.

The normalization factor computation unit 216 computes a normalization factor, using weights for each frequency band (S3). To the normalization factor computation unit 216, weights are set with respect to each of a plurality of frequency bands in advance. The normalization factor computation unit 216 extracts characteristic values of the scale converted data with respect to each frequency band. The normalization factor computation unit 216 computes a normalization factor by performing weighted addition of the plurality of characteristic values.

The normalization unit 217 computes a normalized ECTF, using the normalization factor (S4). The normalization unit 217 computes a normalized ECTF by multiplying the ECTF in the time domain by the normalization factor.

The transform unit 218 computes a frequency response of the normalized ECTF (S5). The transform unit 218 computes a normalized power spectrum and a normalized phase spectrum by performing discrete Fourier transform or the like on the normalized ECTF.

The dip correction unit 219 corrects a dip in the normalized power spectrum, using a different threshold value for each frequency band (S6). For example, the dip correction unit 219 interpolates a point at which a power value of the normalized power spectrum falls below the first threshold value TH1 in a low frequency band. The dip correction unit 219 interpolates a point at which a power value of the normalized power spectrum falls below the second threshold value TH2 in a high frequency band. This processing enables correction to be performed in such a way that a dip of the normalized power spectrum coincides with the threshold value with respect to each band. This capability enables a corrected power spectrum to be obtained.

The filter generation unit 220 computes time domain data, using the corrected power spectrum (S7). The filter generation unit 220 computes inverse characteristics of the corrected power spectrum. The inverse characteristics are data that cancel out headphone characteristics based on the corrected power spectrum. The filter generation unit 220 computes time domain data by performing inverse FFT on the inverse characteristics and the normalized phase spectrum computed in S5.

The filter generation unit 220 computes an inverse filter by cutting out the time domain data with a specified filter length (S8). The filter generation unit 220 outputs inverse filters Linv and Rinv to the out-of-head localization device 100. The out-of-head localization device 100 reproduces a reproduction signal having been subjected to the out-of-head localization using the inverse filters Linv and Rinv. This processing enables the user U to listen to a reproduction signal having been subjected to the out-of-head localization appropriately.

Note that, although, in the above-described embodiment, the processing device 201 generates the inverse filters Linv and Rinv, the processing device 201 is not limited to a processing device that generates the inverse filters Linv and Rinv. For example, the processing device 201 is suitable for a case where it is necessary to perform processing to normalize a sound pickup signal appropriately.

A part or the whole of the above-described processing may be executed by a computer program. The above-described program can be stored using any type of non-transitory computer readable medium and provided to the computer. The non-transitory computer readable media include various types of tangible storage media. Examples of the non-transitory computer readable medium include a magnetic storage medium (such as a floppy disk, a magnetic tape, and a hard disk drive), an optical magnetic storage medium (such as a magneto-optical disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory)). The program may be provided to a computer using various types of transitory computer readable media. Examples of the transitory computer readable medium include an electric signal, an optical signal, and an electromagnetic wave. The transitory computer readable medium can supply the program to a computer via a wired communication line, such as an electric wire and an optical fiber, or a wireless communication line.

Although the invention made by the inventors are specifically described based on embodiments in the foregoing, it is needless to say that the present invention is not limited to the above-described embodiments and various changes and modifications may be made without departing from the scope of the invention.

The present disclosure is applicable to a processing device that processes a sound pickup signal.

What is claimed is:

1. A processing device comprising:

a processor coupled to a memory storing instructions to permit the processor to function as:

an envelope computation unit configured to compute an envelope for a frequency response of a sound pickup signal detected a microphone;

a scale conversion unit configured to generate scale converted data by performing scale conversion and data interpolation on frequency data of the envelope;

a normalization factor computation unit configured to divide the scale converted data into a plurality of frequency bands, obtain a characteristic value for each frequency band, and compute a normalization factor, based on the characteristic values;

a normalization unit configured to, using the normalization factor, normalize the sound pickup signal in a time domain, a transform unit configured to transform the normalized sound pickup signal to a frequency domain and compute a normalized frequency response;

a dip correction unit configured to perform dip correction on a power value or an amplitude value of the normalized frequency response; and a filter generation unit configured to generate a filter, using the normalized frequency response subjected to the dip correction and configured to output the filter to an out-of-head localization device which reproduces a reproduction signal on which an out-of-head localization is performed using the filter to headphones or earphones.

2. The processing device according to claim 1, wherein the dip correction unit corrects a dip, using a different threshold value for each frequency band.

3. The processing device according to claim 1, wherein the normalization factor computation unit obtains a plurality of characteristic values with respect to each of the frequency bands and computes the normalization factor by performing weighted addition of the plurality of characteristic values.

4. A processing method comprising:

a step of computing an envelope for a frequency response of a sound pickup signal detected by a microphone;

a step of generating scale converted data by performing scale conversion and data interpolation on frequency data of the envelope;

a step of dividing the scale converted data into a plurality of frequency bands, obtaining a characteristic value for each frequency band, and computing a normalization factor, based on the characteristic values;

a step of, using the normalization factor, normalizing the sound pickup signal in a time domain, a step of transforming the normalized sound pickup signal to a frequency domain and compute a normalized frequency response;

a step of performing dip correction on the normalized frequency response;

a step of generating a filter, using the normalized frequency response subjected to the dip correction; and a step of outputting the filter to an out-of-head localization device which reproduces a reproduction signal on which the out-of-head localization is performed using the filter to headphones or earphones.

5. A reproducing method comprising
a step of performing out-of-head localization on a reproduction signal, using the filter generated by the processing method according to claim 4.

6. A non-transitory computer readable medium storing program causing a computer to execute a processing method, the processing method comprising:
a step of computing an envelope for a frequency response of a sound pickup signal;
a step of generating scale converted data by performing scale conversion and data interpolation on frequency data of the envelope;
a step of dividing the scale converted data into a plurality of frequency bands, obtaining a characteristic value for each frequency band, and computing a normalization factor, based on the characteristic values;
a step of, using the normalization factor, normalizing the sound pickup signal in a time domain,
a step of transforming the normalized sound pickup signal to a frequency domain and compute a normalized frequency response;
a step of performing dip correction on the normalized frequency response;
a step of generating a filter, using the normalized frequency response subjected to the dip correction; and
a step of outputting the filter to an out-of-head localization device which outputs signal performed by the out-of-head localization on a reproduction process using the filter to headphones or earphones.

* * * * *